United States Patent
Son et al.

(10) Patent No.: US 8,704,780 B2
(45) Date of Patent: Apr. 22, 2014

(54) HAPTIC FEEDBACK DEVICE AND ELECTRONIC DEVICE

(75) Inventors: Yeon Ho Son, Gyunggi-do (KR); Jae Kyung Kim, Gyunggi-do (KR); Dong Sun Park, Seoul (KR); Kum Kyung Lee, Gyunggi-do (KR); Dae Woong Yun, Incheon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 225 days.

(21) Appl. No.: 12/662,091

(22) Filed: Mar. 30, 2010

(65) Prior Publication Data

US 2011/0084917 A1   Apr. 14, 2011

(30) Foreign Application Priority Data

Oct. 12, 2009   (KR) .................. 10-2009-0096964

(51) Int. Cl.
*G06F 3/041*   (2006.01)

(52) U.S. Cl.
USPC .................. 345/173; 340/407.1; 310/317

(58) Field of Classification Search
USPC ............... 345/156–184; 340/407.1–407.2; 361/679.01–679.29; 379/428.01; 702/54–56; 310/311–320
See application file for complete search history.

(56) References Cited

U.S. PATENT DOCUMENTS

| | | | |
|---|---|---|---|
| 7,728,819 B2 | 6/2010 | Inokawa | |
| 8,265,308 B2* | 9/2012 | Gitzinger et al. | 381/152 |
| 2006/0052143 A9* | 3/2006 | Tuovinen | 455/575.1 |
| 2006/0119586 A1 | 6/2006 | Grant et al. | |
| 2006/0152112 A1* | 7/2006 | Sasaki | 310/331 |
| 2007/0080951 A1 | 4/2007 | Maruyama et al. | |
| 2008/0122315 A1 | 5/2008 | Maruyama et al. | |
| 2009/0045700 A1* | 2/2009 | Sasaki et al. | 310/348 |
| 2009/0160763 A1* | 6/2009 | Cauwels et al. | 345/156 |
| 2010/0090813 A1* | 4/2010 | Je et al. | 340/407.2 |
| 2010/0090814 A1* | 4/2010 | Cybart et al. | 340/407.2 |
| 2010/0325931 A1* | 12/2010 | Rosenberg | 42/1.08 |
| 2011/0025609 A1* | 2/2011 | Modarres et al. | 345/173 |

FOREIGN PATENT DOCUMENTS

| | | |
|---|---|---|
| CN | 1678978 | 10/2005 |
| KR | 10-2006-0113917 | 11/2006 |

OTHER PUBLICATIONS

Korean Office Action issued Apr. 19, 2011 in corresponding Korean Patent Application 10-2009-0096964.
Chinese Office Action issued Sep. 4, 2012 in corresponding Chinese Patent Application No. 201010158206.9.
Chinese Office Action issued Jun. 19, 2013 in corresponding Chinese Application No. 201010158206.9.

* cited by examiner

Primary Examiner — Liliana Cerullo

(57) ABSTRACT

A haptic feedback device includes: a haptic device receiving a contact pressure applied thereto; and an actuator provided to the haptic device and excited according to a change in the contact pressure of the haptic device to generate vibrations.

9 Claims, 9 Drawing Sheets

HAPTIC FEEDBACK DEVICE AND ELECTRONIC DEVICE

CROSS-REFERENCE TO RELATED APPLICATIONS

This application claims the priority of Korean Patent Application No. 10-2009-0096964 filed on Oct. 12, 2009, in the Korean Intellectual Property Office, the disclosure of which is incorporated herein by reference.

BACKGROUND OF THE INVENTION

1. Field of the Invention

The present invention relates to a haptic feedback device and an electronic device.

2. Description of the Related Art

Recently, the use of touch-type devices allowing for an inputting operation in electronic devices (or home appliances) through a touch (contact) operation is generalized according to the demands of users who desire to use electronic appliances in a simpler manner.

Currently, a haptic feedback device follows the concept of providing an intuitional user interface experience and diversifying types of contact feedback, in addition to facilitating the concept of performing an inputting operation through a touch.

The haptic feedback device has many advantages: It can save space, accomplish an improvement in manipulation and simplicity, allow for a simple change in specification, have a high level of user recognition, and have good interworkability with IT devices.

With such advantages, the haptic feedback device is commonly employed in electronic devices used in home computers, traffic note issuing devices, public information services, medical equipment, mobile communications purposes, etc.

In general, the related art electronic device uses a vibration motor to implement a haptic function. The vibration motor was devised to vibrate the entire electronic device body, so, in order to increase vibration force, the size of a mass body must be increased.

Also, the vibration motor has an additional problem in that it increases unit cost, must be installed in a limited internal space of an electronic device, and is ineffective in terms of power consumption as it is designed to vibrate the entire electronic device.

Also, recently, as user interfaces are advancing and the functions of electronic devices have become diversified and complicated, the vibration motor simply devised to vibrate the entire electronic device cannot come up with the implementation of various types of feedback according to the diversified functions.

SUMMARY OF THE INVENTION

An aspect of the present invention provides a haptic feedback actuator including a vibration plate attached to a haptic device that implements a haptic function to transfer vibrations and an actuator applying vibrations to the vibration plate, a haptic feedback device including the haptic feedback actuator, and an electronic device.

Another aspect of the present invention provides a haptic feedback device including an actuator disposed at a central portion of a haptic device that implements a haptic function to enhance vibration efficiency, and an electronic device.

Another aspect of the present invention provides a haptic feedback device providing an optimum bonding condition for a haptic device that implements a haptic function to generate a stable amount of vibrations and a haptic feedback actuator, and an electronic device.

According to an aspect of the present invention, there is provided a haptic feedback device including: a haptic device receiving a contact pressure applied thereto; and an actuator provided to the haptic device and excited according to changes in contact pressure with the haptic device to generate vibrations.

The actuator may be disposed at a central portion of the haptic device.

The actuator may be disposed at a central portion of an edge portion in a lengthwise direction of the haptic device.

The central portion in which the actuator is disposed may be within the range of 20% to 80% of the overall length of the haptic device from one end portion toward another end portion thereof.

The actuator may be a piezo-actuator or a polymer actuator.

The haptic feedback device may further include: a vibration plate interposed between the haptic device and the actuator and transferring vibrations generated from the actuator to the haptic device.

The vibration plate includes a plurality of branch lines formed from the edge portion in the lengthwise direction of the haptic device, and the branch lines may be demarcated by a slit.

The actuator may be attached to the branch lines and horizontally disposed with relation to the branch lines.

According to another aspect of the present invention, there is provided an electronic device including: a case having an internal space formed therein; a display panel accommodated to be disposed within the case; and an actuator excited according to changes in a contact pressure with the display panel to generate vibrations, wherein the actuator is disposed at a central portion of the display panel.

The actuator may be disposed at an edge portion in a lengthwise direction of the display panel.

The central portion in which the actuator is disposed may be within the range of 20% to 80% of the overall length of the display panel from one end portion toward another end portion of the display panel.

The electronic device may further include: a vibration plate interposed between the haptic device and the actuator and transferring vibrations generated from the actuator to the haptic device.

The vibration plate includes a plurality of branch lines formed from the edge portion in the lengthwise direction of the display panel, and the branch lines may be demarcated by a slit.

The actuator may be attached on the branch lines and horizontally disposed parallelly with relation to the branch lines.

The actuator may be a piezo-actuator or a polymer actuator.

The piezo-actuator may be a ceramic stacked body including ceramic layers and an electrode interposed between the ceramic layers, and polarizations (or pollings) of the ceramic layers may be formed in the same direction.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
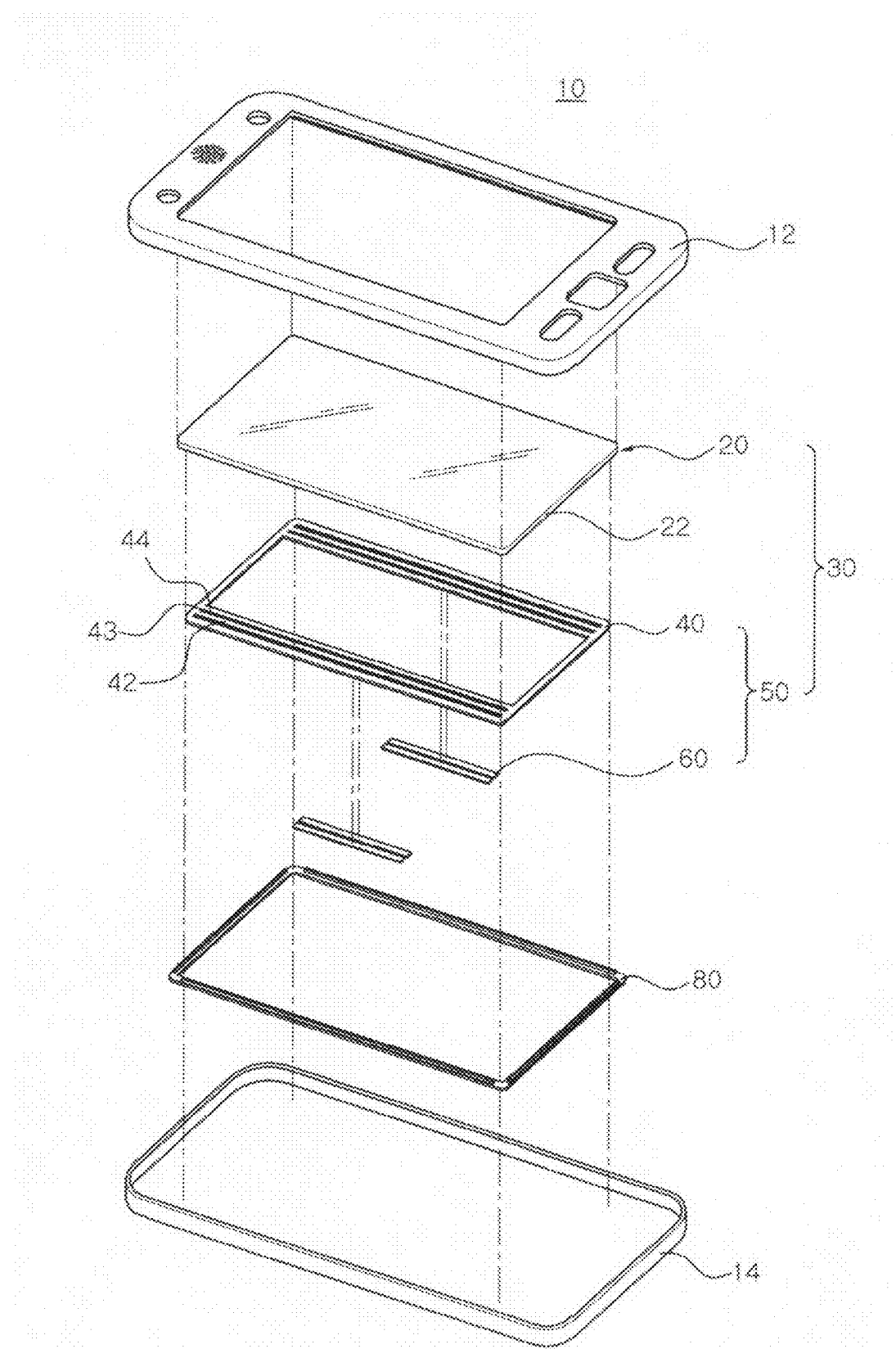
FIG. 1 is an exploded perspective view of a mobile communications terminal or an electronic device, according to an exemplary embodiment of the present invention.

Exemplary embodiments of the present invention will now be described in detail with reference to the accompanying drawings. The invention may however be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

A haptic feedback actuator, as well as a haptic feedback device and an electronic device having the haptic feedback actuator according to exemplary embodiments of the present invention will now be described with reference to FIGS. 1 to 11.

[Electronic Device]

Figure 2:
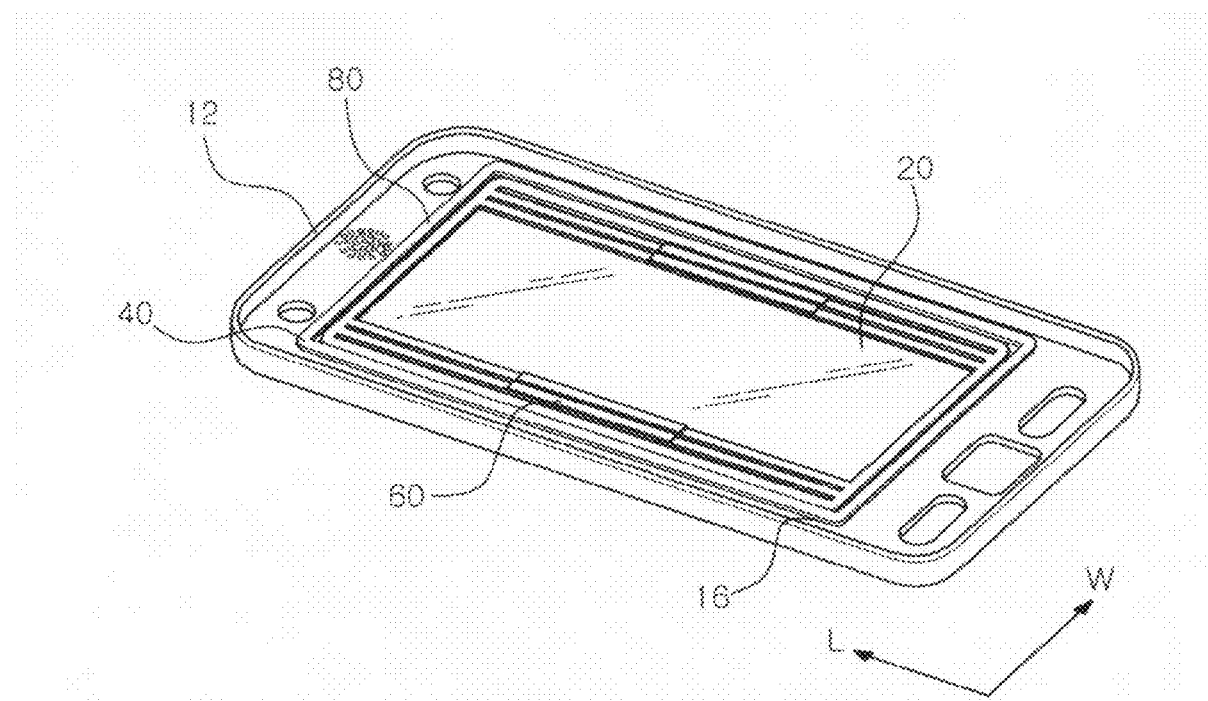
FIG. 2 is a perspective view schematically showing a haptic feedback device mounted in a case of the mobile communications terminal according to an exemplary embodiment of the present invention.
Figure 3:
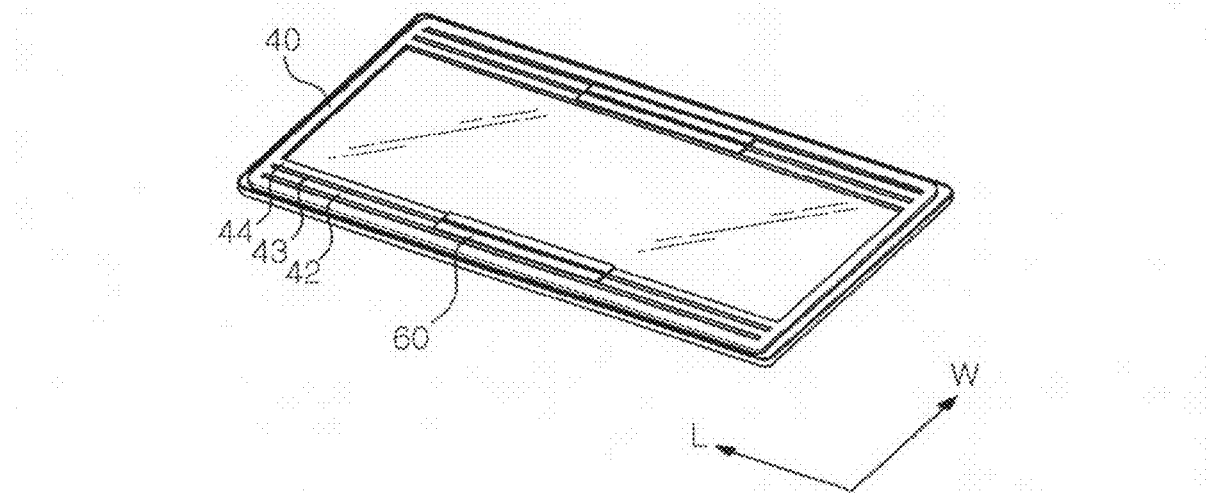
FIG. 3 is a perspective view schematically showing the haptic feedback device according to an exemplary embodiment of the present invention.

FIG. 1 is an exploded perspective view of a mobile communications terminal, an electronic device, according to an exemplary embodiment of the present invention. FIG. 2 is a perspective view schematically showing a haptic feedback device mounted in a case of the mobile communications terminal according to an exemplary embodiment of the present invention. FIG. 3 is a perspective view schematically showing the haptic feedback device according to an exemplary embodiment of the present invention.

In the following description, a mobile communications terminal 10 will be taken as an electronic device according to an exemplary embodiment of the present invention, but without being limited thereto, the electronic device can be also applicable to a general haptic device generating a change in vibration according to a user contact with devices such as various OA devices, medical equipment, mobile communications devices, traffic note issuing device, or the like.

The mobile communications terminal 10 as an electronic device will now be described in detail.

With reference to FIGS. 1 to 3, the mobile communication terminal 10, an electronic device, according to an exemplary embodiment of the present invention may include cases 12 and 14, a display panel 22, an actuator 60, and a vibration plate 40.

The cases 12 and 14 may include a front case 12 and a rear case 14. The front case 12 and the rear case 14 may be coupled to form an internal space therebetween.

A display panel 22 serving as a haptic device 20, and a circuit board (not shown) that can drive a haptic feedback actuator 30 can be mounted in the internal space.

Here, the haptic device 20, a mechanism requiring vibration, is an internal element of the mobile communication terminal 10 that requires a reaction upon external contact pressure.

Besides the display panel 22 of the mobile communication terminal 10, the haptic device 20 may also be an input device, an OA device, a vending machine, a bed, a card, a driving device, a ticket, etc.

In the mobile communications terminal 10, an electronic device according to the present exemplary embodiment, the display panel 22 providing an image is employed as the haptic device 20. Namely, when contact pressure is changed according to a contact applied to the display panel 22, the display panel 22 reacts haptically to the contact.

In order to allow the display panel 22 to react haptically, the actuator 60 must generate vibrations. A substantial vibration generation principle of the actuator 60 will be described later.

The vibration plate 40 may transfer the vibration generated from the actuator 60 to the display panel 22. The actuator 60 may be directly attached to the display panel 22 to make the display panel 22 vibrate, but it can be selectively used as necessary to reduce an impact caused by vibration or to amplify vibration.

Namely, the vibration plate 40 may be fabricated by injection-molding an impact-lessening material; however, the present invention is not intended to be limited thereto. Also, the thickness of the vibration plate 40 may be adjusted in consideration of an interaction with the actuator 60. Experimentation shows that vibrations increased rapidly when the thickness of the vibration plate was smaller than 0.2 mm, so the thickness of the vibration plate 40 can be properly selected depending on the requirement range of vibration.

The haptic feedback actuator 30 and the haptic device will now be described in detail. The detailed characteristics of the haptic feedback actuator and the haptic device described hereafter can be all applicable to the electronic device of the present invention.

[Haptic Feedback Actuator and Haptic Feedback Device]

The haptic feedback actuator 30 according to an exemplary embodiment of the present invention may include the vibration plate 40 and the actuator 60. Also, a haptic feedback device 50 may include the haptic device 20 to which a contact pressure is applied and the haptic feedback actuator 30 that vibrates the haptic device 20.

Here, the vibration plate 40 of the haptic feedback device 50 may be optional.

The vibration plate 40 has been described above in detail with respect to the mobile terminal 10, and may be attached along the edges constituting the configuration of the haptic device 20.

Namely, as shown in FIG. 3, the vibration plate 40 may be formed as a thin strip and disposed along the edges in a rectangular shape of the display panel 22.

Here, it is assumed that a longer side of the rectangular display panel 22 is defined as a lengthwise direction and a shorter side is defined as a widthwise direction.

In detail, the vibration plate 40 may have a plurality of branch lines 42 and 44 at the edge portion in the lengthwise direction of the display panel 22, the haptic device 20, and a slit 43 may be formed between the plurality of branch lines 42 and 44. The branch lines 42 and 44 may have substantially the same width, and the bar-shaped actuator 60 having almost the same width as that of the branch lines 42 and 44 may be attached to be disposed on the branch lines 42 and 44. In this case, the actuator 60 may be disposed to be parallel with relation to the branch lines 42 and 44.

The actuator may be configured as a piezo-actuator or a polymer actuator so as to be excited according to a change in a contact pressure of the haptic device 20 to generate vibration.

Meanwhile, the length of the actuator 60 and the vibration plate 40 and the disposition location of the actuator 60 at the haptic device 20 are important factors in determining the amount of vibrations of the haptic device 20.

A change in the amount of vibrations according to the length of the actuator 60 and the vibration plate 40 will now be described in detail.

Figure 4A:
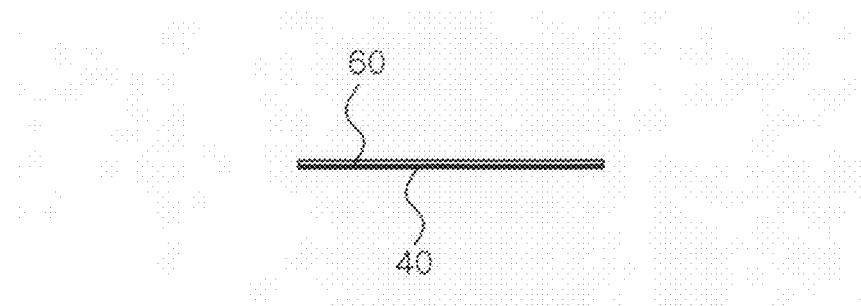
FIGS. 4(a) and 4(b) are side views showing actuators and vibration plates of an haptic feedback actuator having different lengths according to an exemplary embodiment of the present invention.
Figure 4B:
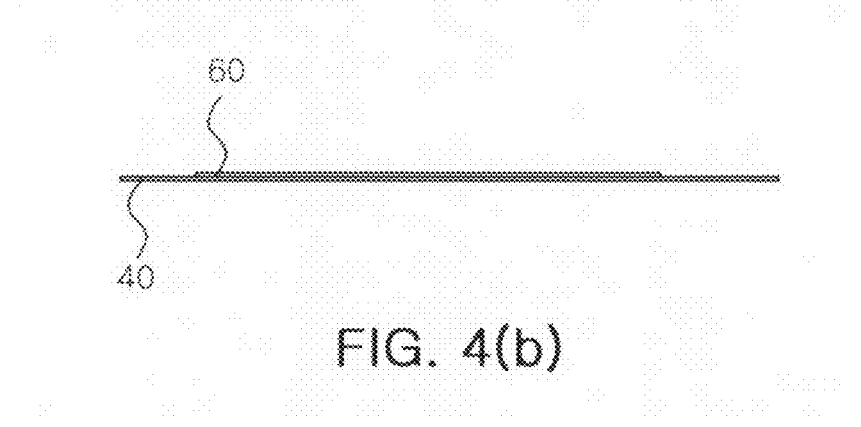
Figure 5A:
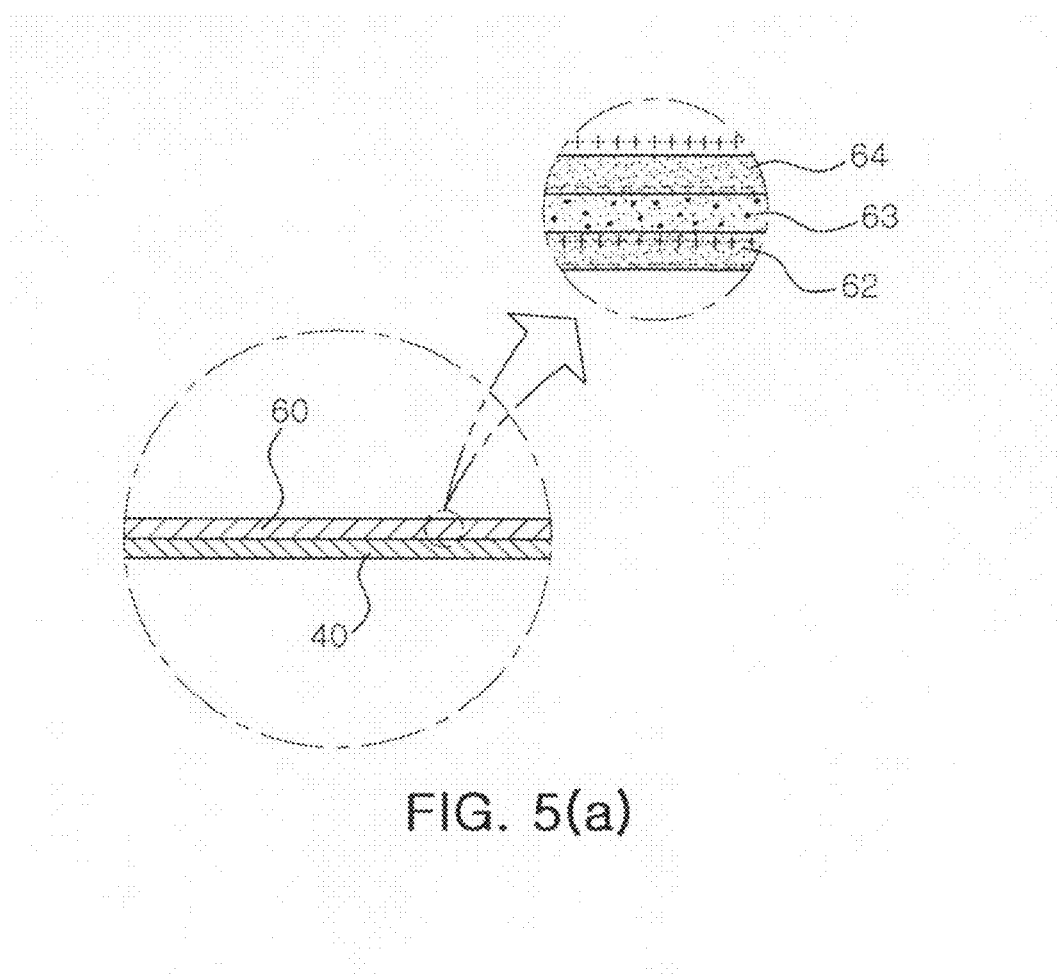
FIGS. 5(a) and 5(b) are an enlarged sectional view of a portion of FIG. 4(b), schematically showing an operational shape of the haptic feedback actuator.
Figure 5B:
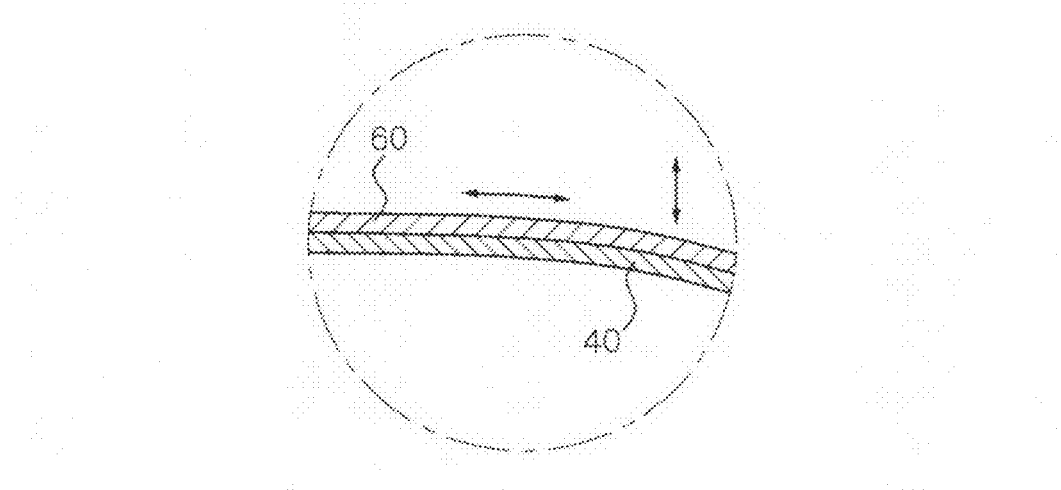
Figure 6:
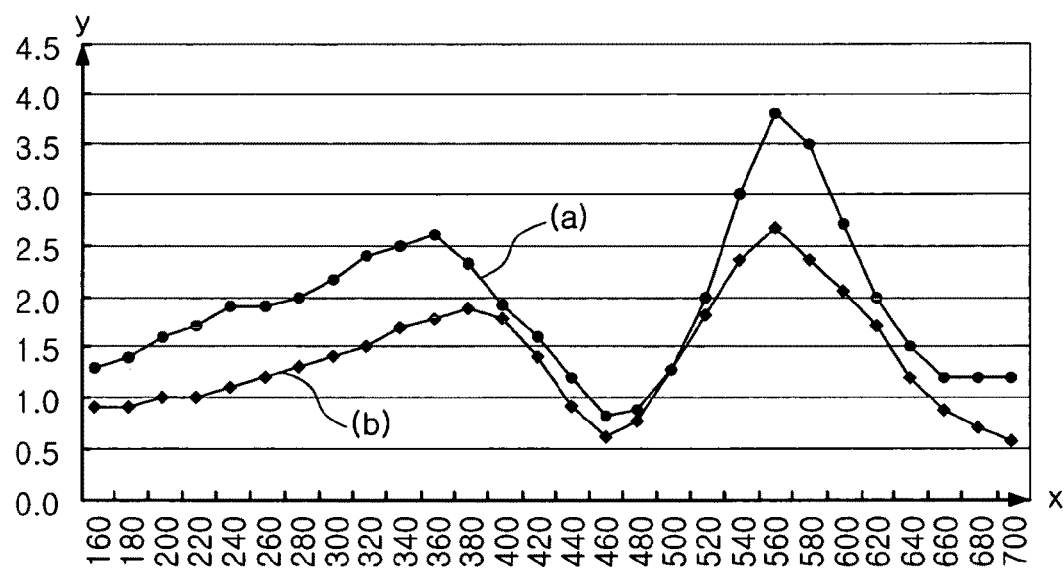
FIG. 6 is a graph displaying the amount of displacement over vibration frequency of the haptic feedback actuator of FIGS. 4(a) and 4(b)

FIGS. 4(a) and 4(b) are side views showing actuators and vibration plates of the haptic feedback actuator having different lengths according to an exemplary embodiment of the present invention. FIGS. 5(a) and 5(b) are an enlarged sectional view of a portion of FIG. 4(b), schematically showing an operational shape of the haptic feedback actuator. FIG. 6 is a graph displaying the amount of displacement over vibration frequency of the haptic feedback actuator of FIGS. 4(a) and 4(b).

FIG. 4(a) shows an exemplary embodiment in which the length of the vibration plate 40 and that of the actuator 60 are equal, and FIG. 4(b) shows an exemplary embodiment in which the vibration plate 40 is longer than the actuator 60.

Here, the amount of displacement (μm) of the haptic device 20 according to the number of vibrations by using a piezo-actuator as the actuator 60 was measured.

As shown in FIGS. 5(a) and 5(b), the piezo-actuator is a ceramic stacked body formed by stacking ceramic layers 62 and 64 on both sides of an electrode 63 made of silver (Ag) or other impurities, and pollings (or polarizations) of the ceramic layers 62 and 64 are formed in the same direction.

As the pollings of the ceramic layers 62 and 64 are formed in the same direction, the amount of vibration increases when compared with the case where the pollings are formed in the opposite directions, so the amount of vibration can be properly selected according to the requirement range of vibration.

When pressure is applied to the piezo-actuator in the state that the pollings of the ceramic layers 62 and 64 are formed in the same direction, the actuator 60 is displaced in the lengthwise direction while the vibration plate 40 is not displaced.

For this reason, when the actuator 60 is displaced in the lengthwise direction, the haptic feedback actuator 30 vibrates up and down.

FIGS. 6(a) and 6(b) are graphs showing results obtained by measuring the amount of vertical displacement of the haptic device 20 while increasing the frequency of vibration according to the exemplary embodiment of FIGS. 4(a) and 4(b).

With reference to FIGS. 6(a) and 6(b), it is noted that the amount of displacement in the embodiment of FIG. 4(a) is greater than that of FIG. 4(b).

Thus, the length of the vibration plate 40 and the actuator 60 can be properly selected to be employed according to the vibration requirement range of the electronic device.

Hereinafter, the amount of vibration of the haptic device 20 according to the disposition location of the actuator 60 at the haptic device 20 will now be described in detail.

Figure 7A:
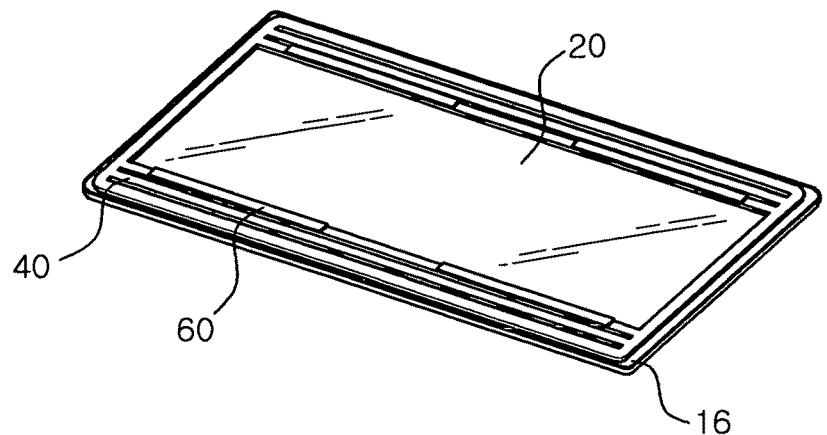
FIGS. 7(a) and 7(b) are schematic perspective views showing a changed disposition location of the actuator of the haptic feedback actuator according to an exemplary embodiment of the present invention.
Figure 7B:
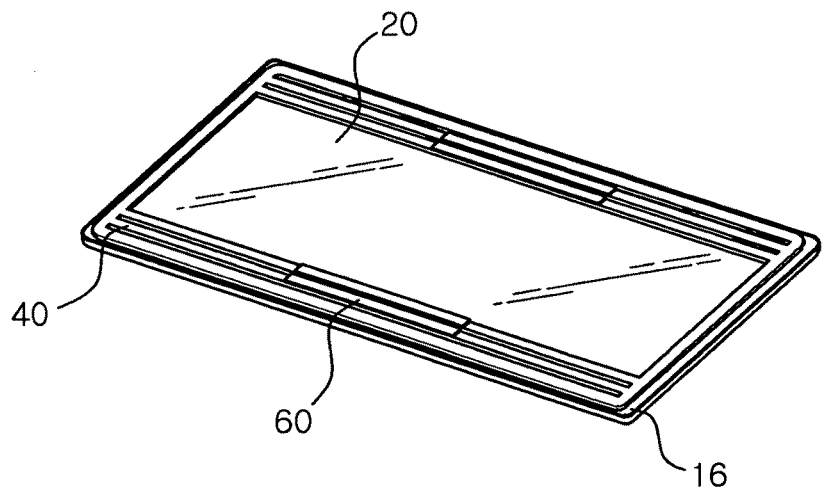
Figure 8:
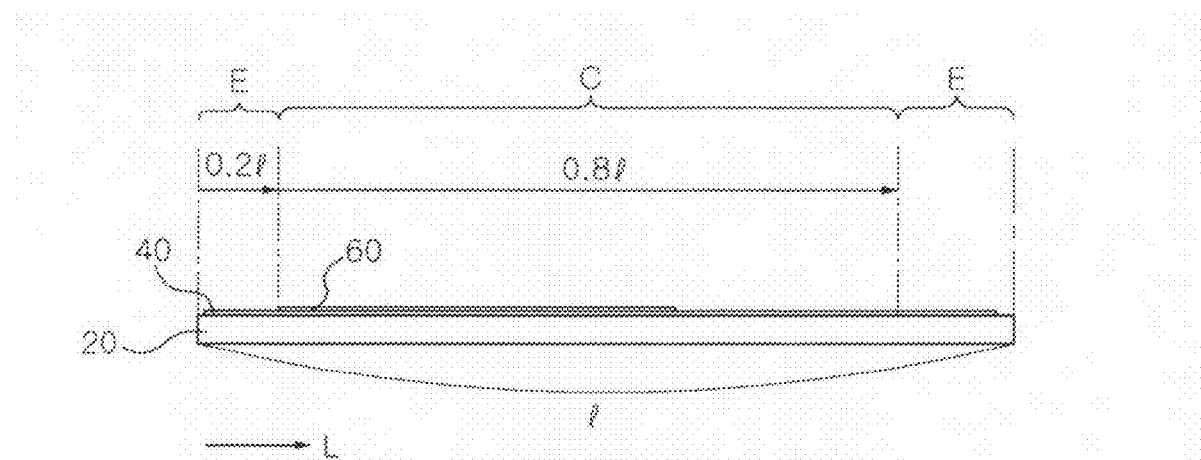
FIG. 8 is a side view for explaining a disposition location of the actuator according to an exemplary embodiment of the present invention.
Figure 9:
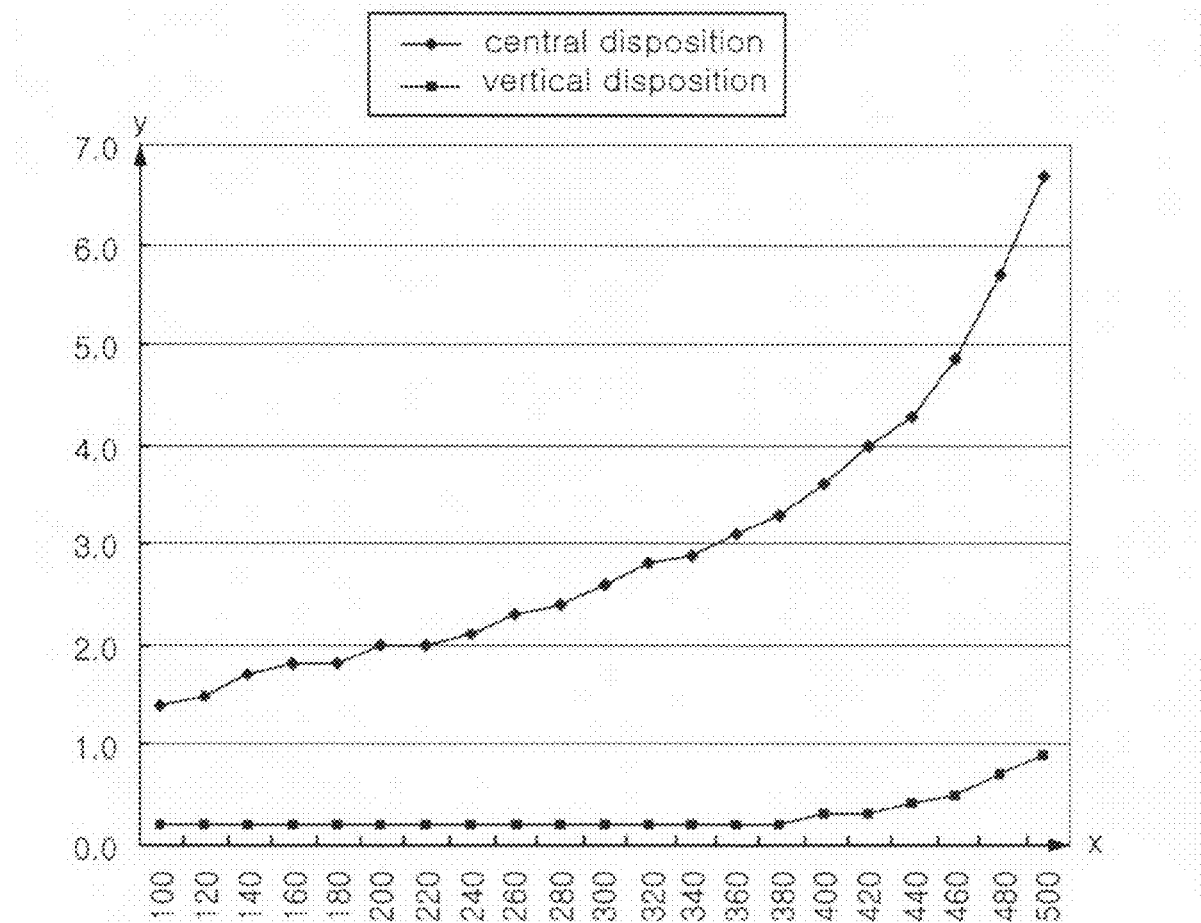
FIG. 9 is a graph displaying the amount of displacement over vibration frequency of the haptic feedback actuator of FIGS. 7(a) and 7(b)

FIGS. 7(a) and 7(b) are schematic perspective views showing a changed disposition location of the actuator of the haptic feedback actuator according to an exemplary embodiment of the present invention. FIG. 8 is a side view for explaining a disposition location of the actuator according to an exemplary embodiment of the present invention. FIG. 9 is a graph displaying the amount of displacement over vibration frequency of the haptic feedback actuator of FIGS. 7(a) and 7(b).

FIG. 7(a) shows an exemplary embodiment in which the actuators 60 are aligned in a row in the lengthwise direction on the display panel 22, namely, the haptic device 20, and FIG. 7(b) shows an exemplary embodiment in which the actuators 60 are centrally disposed in parallel at the central portion of the display panel 22.

Here, the central portion of the display panel 22 may be a central portion in a widthwise direction based on the entire display panel 22 or may be a central portion (C) in the lengthwise direction.

With reference to FIG. 8, the central portion (C) where the actuators 60 are aligned may be set to be within the range from 20% to 80% of the overall length of the display panel, namely, from one end portion to the other end portion of the display panel 20. The other portions are set as edge portions (E) for the sake of convenience.

Meanwhile, the vibration plate 40 may be selectively employed according to a required range of vibrations of the electronic device.

FIG. 9 is a graph showing the results obtained by measuring the amount of vertical displacement of the haptic device 20 while increasing the frequency of vibrations by applying a contact pressure in the exemplary embodiments of the present invention.

With reference to FIG. 9, it is noted that the displacement of the actuators 60 disposed at the central portion of the display panel 22 increases at the ratio of geometrical progression as the frequency of vibrations increases.

Thus, the disposition location of the actuators 60 can be properly selectively employed in the haptic device according to the vibration requirement range of the electronic device.

An exemplary embodiment in which an adhesive for the haptic device 20 and the vibration plate 40 and that of the vibration plate 40 and the actuator 60 are varied as a factor of displacement will now be described.

Figure 10:
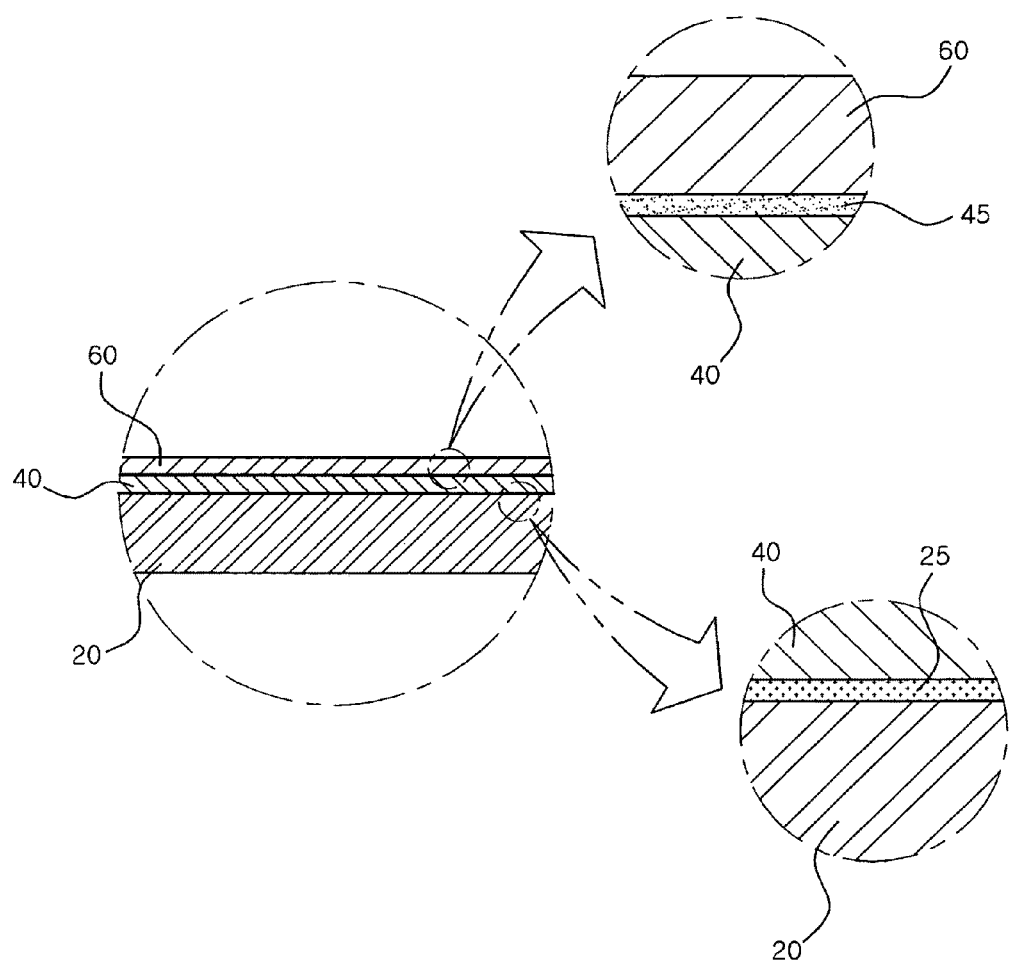
FIG. 10 is a schematic sectional view showing bonding of the haptic feedback device according to an exemplary embodiment of the present invention.
Figure 11:
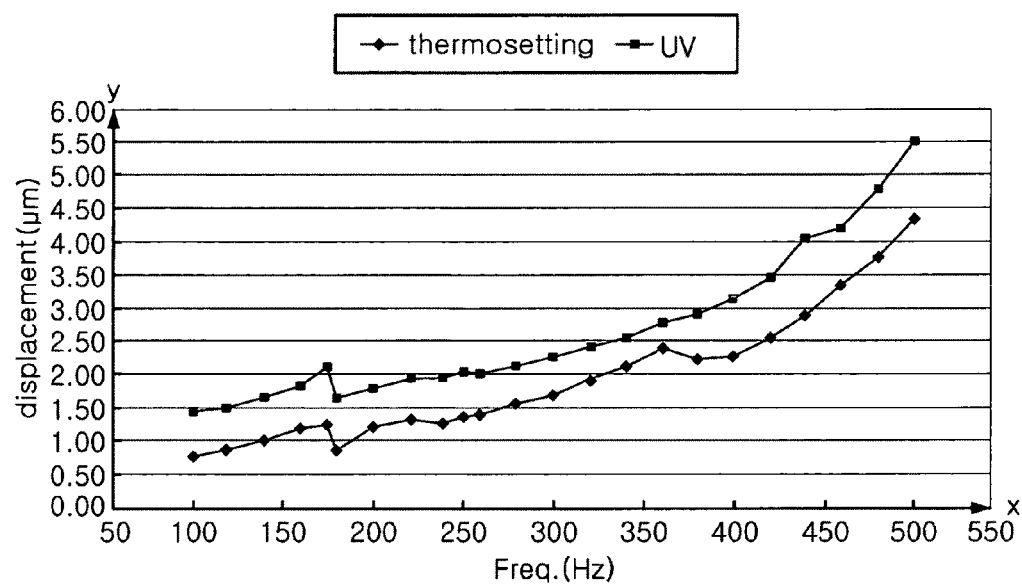
FIG. 11 is a graph displaying the amount of displacement over vibration frequency of the haptic feedback actuator measured according to the types of bonding materials used in the haptic feedback device according to an exemplary embodiment of the present invention.

FIG. 10 is a schematic sectional view showing bonding of the haptic feedback device according to an exemplary embodiment of the present invention. FIG. 11 is a graph displaying the amount of displacement over vibration frequency of the haptic feedback actuator measured according to various types of bonding materials for the haptic feedback device according to an exemplary embodiment of the present invention.

With reference to FIG. 10, an anaerobic adhesive 25 was used as an adhesive for the haptic device 20 and the vibration plate 40, and a thermosetting adhesive 45 was used as an adhesive of the vibration plate 40 and the actuator 60.

The anaerobic adhesive 25 has properties such that it can block air, is clean, and is resistant to a vibration impact. Here, the anaerobic adhesive 26 may be a UV adhesive.

Thus, in order to properly transfer vibrations as much as possible without causing a displacement on the haptic device 20, the anaerobic adhesive 25 can be selected as it effectively transfers vibration when compared with an adhesive made of a rubber material.

Meanwhile, the vibration plate 40 and the actuator need to use the thermosetting adhesive 45 that can maintain variation rigidity and has a greater adhesive strength when compared with the transfer or vibration.

FIG. 11 is a graph showing the amount of displacement according to a change in the number of times of vibration measured with the anaerobic adhesive 25 and the thermosetting adhesive 45. It is noted that the anaerobic adhesive 25 shows a remarkable increase in the amount of vibrations according to the increase in the frequency of vibrations, while the thermosetting adhesive 45 shows firm fixing, although the amount of vibrations according to an increase in the frequency of vibrations does not greatly increase.

As described above, according to the haptic feedback actuator, and the haptic feedback device and the electronic device having the same, the size of the electronic device can be reduced when compared with an electronic device employing a vibration motor, and the utilization of the internal space of the electronic device can be enhanced.

In addition, because the disposition location or the length of the actuator can be variably selected according to the vibration range required for an electronic device, the present invention can be applicable to various applications.

Also, because the electronic device itself is not vibrated overall, the present invention is very effective in terms of power consumption, Moreover, various feedbacks can be implemented in line with the recent advancement of user interfaces.

As set forth above, the haptic feedback actuator, and the haptic feedback device and the electronic device including the haptic feedback actuator according to exemplary embodiments of the invention have the following advantages.

That is, first, the size of the electronic device can be reduced compared with an electronic device employing a vibration motor, and the utilization of the internal space of the electronic device can be enhanced.

Second, because the disposition location or the length of the actuator can be variably selected according to a vibration range required for an electronic device, the present invention can be applicable to various applications.

Third, because the overall electronic device is not vibrated, the present invention is very effective in terms of power consumption.

Fourth, various types of feedback can be implemented in line with the recent advancements in user interfaces.

While the present invention has been shown and described in connection with the exemplary embodiments, it will be apparent to those skilled in the art that modifications and variations can be made without departing from the spirit and scope of the invention as defined by the appended claims.

What is claimed is:

1. A haptic feedback device comprising:
a haptic device receiving a contact pressure applied thereto;
an actuator provided to the haptic device and excited according to changes in the contact pressure with the haptic device to generate vibrations; and
a vibration plate interposed between the haptic device and the actuator, the vibration plate comprising a plurality of branch lines demarcated by a slit and transferring vibrations generated from the actuator to the haptic device,
wherein the vibration plate is formed as a strip and disposed along edge portions of the haptic device in a rectangular manner, the branch lines and the slit are formed in the edge portion of the vibration plate in the longer side direction thereof, the slit penetrates the vibration plate in a thickness direction, and respective actuators are attached to respective branch lines in central portions in the longer side direction thereof.

2. The device of claim 1, wherein the central portion where the actuator is disposed is within the range of 20% to 80% of the overall length of the haptic device from one end portion toward another end portion thereof.

3. The device of claim 1, wherein the actuator is a piezo-actuator or a polymer actuator.

4. The device of claim 1, wherein the actuator is horizontally disposed to be parallel to the branch lines.

5. An electronic device comprising:
a case having an internal space formed therein;
a display panel accommodated to be disposed within the case;
an actuator excited according to changes in a contact pressure with the display panel to generate vibrations; and
a vibration plate interposed between the display panel and the actuator and comprising a plurality of branch lines demarcated by a slit and formed from the edge portion in a lengthwise direction of the display panel and transferring vibrations generated from the actuator to the display panel,
wherein the vibration plate is formed as a strip and disposed along edge portions of the haptic device in a rectangular manner, the branch lines and the slit are formed in the edge portion of the vibration plate in the longer side direction thereof, the slit penetrates the vibration plate in a thickness direction, and respective actuators are attached to respective branch lines in a central portion in the longer side direction thereof.

6. The device of claim 5, wherein the central portion where the actuator is disposed is within the range of 20% to 80% of the overall length of the display panel from one end portion toward another end portion of the display panel.

7. The device of claim 5, wherein the actuator is horizontally disposed to be parallel with relation to the branch lines.

8. The device of claim 5, wherein the actuator is a piezo-actuator or a polymer actuator.

9. The device of claim 8, wherein the piezo-actuator is a ceramic stacked body including ceramic layers and an electrode interposed between the ceramic layers, and polarizations of the ceramic layers are formed in the same direction.

* * * * *